Figures 1, 2:
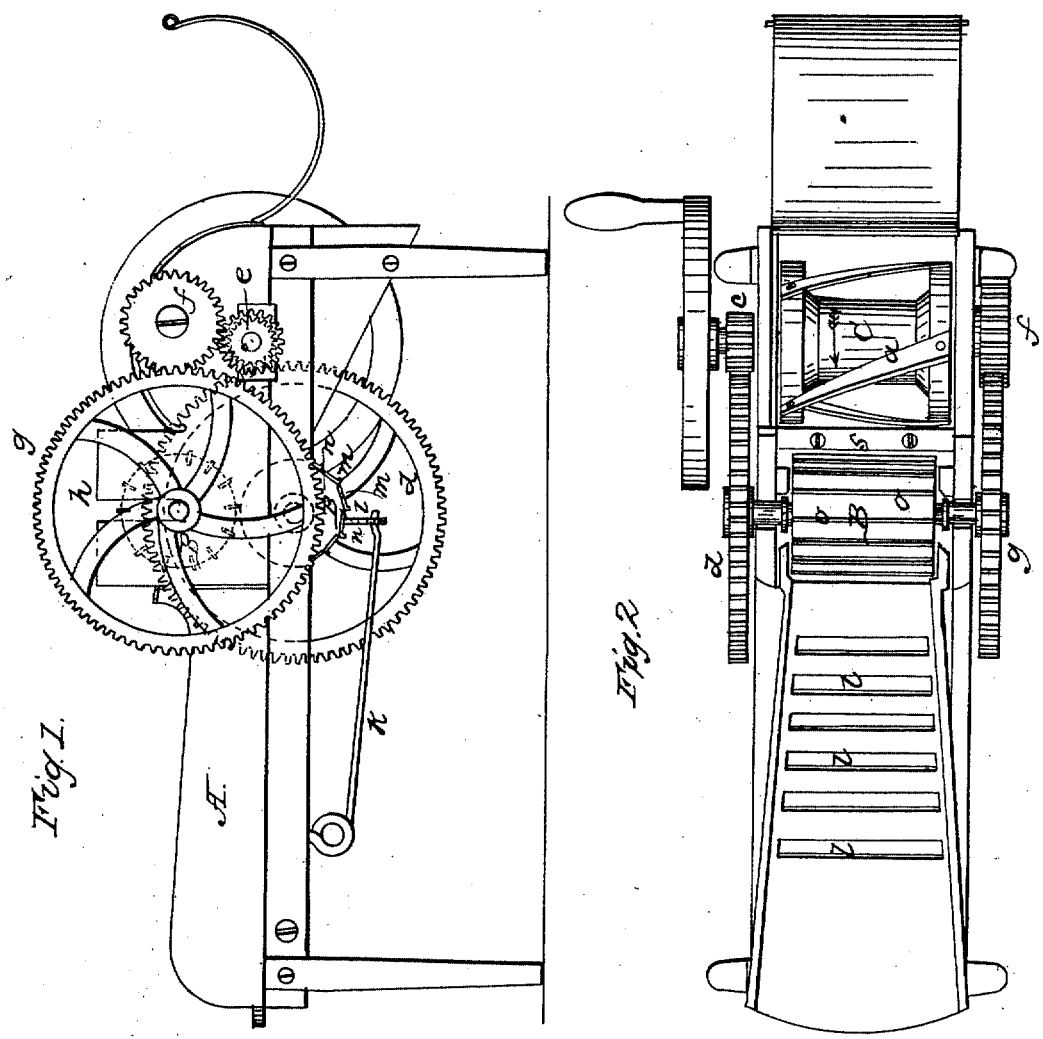

T. H. & D. T. WILLSON.
Straw Cutter.

No. 19,462.

2 Sheets—Sheet 1.

Patented Feb. 23, 1858.

T. H. & D. T. WILLSON.
Straw Cutter.
No. 19,462.
2 Sheets—Sheet 2.
Patented Feb. 23, 1858.
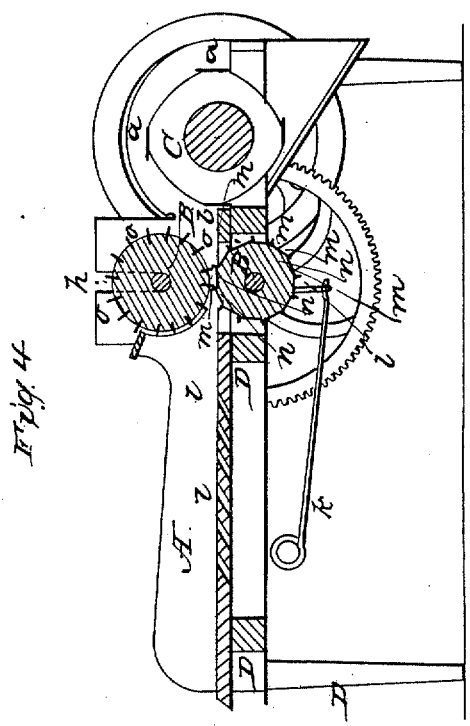
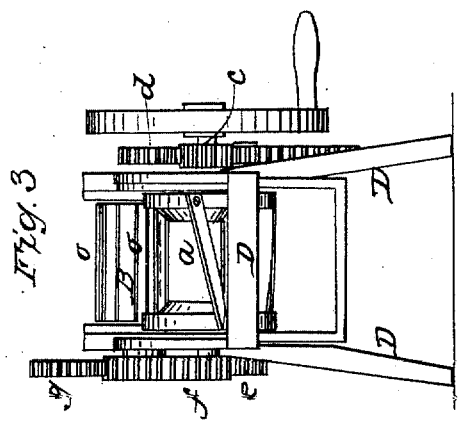
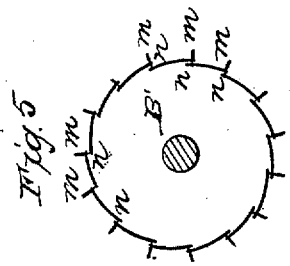

UNITED STATES PATENT OFFICE.

THOS. H. WILLSON AND DANIEL T. WILLSON, OF HARRISBURG, PENNSYLVANIA.

STRAW-CUTTER.

Specification of Letters Patent No. 19,462, dated February 23, 1858.

*To all whom it may concern:*

Be it known that we, T. H. WILLSON and DANIEL T. WILLSON, of Harrisburg, county of Dauphin, State of Pennsylvania, have invented certain new and useful Improvements in Cornstalk and Straw Cutters, of which the following is a full, clear, and exact description, reference being had to the accompanying drawings, forming part of this specification, in which—

Figure 1: represents a side elevation of a corn stalk and straw cutter embracing our improvements: Fig. 2: represents a plan of the same: Fig. 3: represents an end elevation: Fig. 4: represents a longitudinal and vertical cross section through the center of the machine: and Fig. 5: represents on an enlarged scale a transverse section through the lower feed roller.

Our improvements in straw cutters relate more especially to that class in which yielding feed rollers are used to crush the straw or stalks, and carry the same to rotary cutters whose axis of revolution is parallel to the axis of the feed rollers, and in which the motion of the feed rollers is derived directly from the cutter shaft. In these machines as heretofore constructed the unyielding roller is driven by the yielding either by means of star gearing, or by spur gearing with a universal joint connection, or it is hung on radius bars, or vibrates in curved guides and driven by spur gearing. The star gearing is objectionable on account of the form required to be given to the teeth, which cannot be well proportioned to resist heavy strains, and from the yielding of the roller the teeth are subject to unequal wearing, which not only greatly diminishes their strength but increases their friction, and consequently the power required to drive the machine. The universal joint coupling forms a weak, cumbersome and expensive connection, which is exceedingly liable to break, and to derangement. The curved guides or radius bars throw the yielding roller as it rises to one side of the lower roller, and it is essential that these rollers in order to crush the material effectually, should at all times be directly over each other, and their axis in the same plane. In these machines also, the discharge openings for the escape of dirt or other hard substances which is shaken out of the straw or stalks as they are fed to the cutters, are made with vertical sides, which catch the projecting ends of the short straws by which means they are carried through these openings with the dirt, and are thus wasted.

The principal object of our improvements is to overcome the before mentioned defects in straw cutters, and our invention for effecting this, consists: First, in arranging the axis of the driving pinion to the yielding roller in such position above the axis of the wheel into which it gears on the yielding roller shaft (when the roller is in its lowest position) that the roller may vibrate in vertical guides perpendicular to the axis of the lower roller, and still be retained in gear with the pinion throughout the entire length of the vibration required to admit the material passing between it and the lower roller. Second: constructing the feeding trough with inclined openings through its bottom, the inclination of the sides of the openings being the reverse of the direction of the motion of the material passing over them to the feed rollers, by which means no impediment is made to the passage of the material over the openings, and the short fodder is carried with the long to the feed rollers; while the sand and dirt or any hard substance which is shaken out of the fodder is allowed to pass freely through the bottom of the trough. Third: Making the lower feed roller hollow, with inclined openings in the periphery, so that the dust and other hard substances which are shaken out of the fodder while under the action of the rollers may pass through and be discharged beneath the machine, instead of being carried forward by the rollers to mingle with the cut feed. Fourth: constructing the lower feed roller with longitudinal ribs projecting from its periphery by which means, not only is the crushing of the fodder and the removal of the dirt adhering to the base of the stalks faciliated, but also the discharge of the dirt through the openings in the roller.

In the accompanying drawings is represented a corn stalk and straw cutter embracing our improvements, which consist mainly of a feeding trough (A) a pair of feeding rollers, (B B') and a cutter head, (C) armed with spiral knives; all of which parts are supported by a frame (D) of proper form to conveniently accommodate them. The cutter head (C) and the shearing knives (a) are constructed in a manner similar to those in use, with the face of the knives inclined to the face of the cutter head and their edges inclined to its axis in order to give a drawing cut.

Between the knives and the feed rollers, is a cutter bar (b) placed exactly parallel to the axis of revolution of the cutters which run close to its edge; and between this bar and the knives the fodder is cut: it is therefore essential for the perfect working of the cutters, that their parallelism should be preserved to this bar.

A toothed pinion, on each end of the cutter shaft, communicates motion to the feed rollers: The pinion (c) on one end gearing into the toothed wheel (d) on the end of the shaft of the lower and unyielding roller (B'), while the pinion (e) on the opposite end of the cutter shaft communicates motion to the upper and yielding roller (B) through an intermediate toothed pinion (f) which gears into the toothed wheel (g) on the yielding roller shaft.

The yielding roller (B) plays in vertical guides (h) perpendicular to the axis of the lower roller, and is confined in these guides so that it can yield and accommodate itself at either end to the amount of material passing under it by straps (i), passing over the shaft and connected with springs (k) on the under side of the frame. The periphery of this roller is armed with projecting ribs (o) to assist in crushing the material as it passes under it. The axis of the intermediate pinion (f) is placed in such position above the axis of the driving wheel (g) of the yielding roller when in its lowest position, that it will admit of the yielding roller rising and falling in its vertical guides, while at the same time it is retained in gear with the pinion in all positions without binding, and throughout the greatest range of motion required to accommodate the material passing between it and the lower feed roller. The range of motion which may be given to the yielding roller without throwing it out of gear with the driving pinion, depends on the diameter of the pinion and of the wheel on the roller shaft into which the pinion gears, either, or both of which, must be increased or diminished as greater or less range is required in the yielding roller. The lower feed roller (B) is a hollow cylinder with inclined openings (n) in its periphery, through which the dirt or other material which is shaken out or removed from the fodder while under the action of the rollers; escapes and is discharged on the under side of the machine, without mingling with the cut feed. This roller is also provided with longitudinal projecting ribs (m) on its periphery which, while they in connection with the ribs on the upper roller, assist in crushing the fodder passing between them, also form a stop, which prevents the dirt collected on the lower roller from sliding forward and mingling with the cut feed; thus facilitating its discharge through the openings in the roller.

Through the bottom of the feeding trough (A) a series of transverse inclined openings (l) are made, the direction of the inclination of the sides of these openings being the reverse to the direction of the motion of the material as it passes to the feed rollers, by which means no obstruction is interposed to the short straws being carried over by the long to the cutter, while a free passage is left for the escape of the dirt, thereby economizing the waste of the short fodder, which is carried with the long to the cutter.

Having thus described our improvements in corn stalk and straw cutters, what we claim therein as new and desire to secure by Letters Patent is—

1. The arrangement of the axis of the driving pinion to the yielding feed roller above the axis of said roller as described, when said yielding feed roller vibrates in vertical guides for the purpose herein set forth.

2. Constructing the feeding trough with inclined openings in its bottom, arranged as described, in order to facilitate the passage of the dirt, and prevent the short pieces of fodder from escaping.

3. Constructing the lower feed roller with openings in its periphery for the escape of the dirt or other hard materials which collect upon it during the passage of the fodder between the rollers.

4. The combination of the longitudinal ribs on the lower feed roller with the openings in its periphery for the purpose described.

In testimony whereof we have subscribed
our names.
   THOS. H. WILLSON.
   DANIEL T. WILLSON.
 Witnesses:
  HIRAM WILLSON,
  HENRY BEADER.

*Disclaimer.*

We herewith make the following disclaimer in the Patent No. 19,462, for straw-cutters, dated Feby. 23, 1858:

"To claim 1, which is as follows:

"The arrangement of the axis of the driving pinion to the yielding feed roller above the axis of said roller as described, when said yielding feed roller vibrates in vertical guides for the purposes set forth.

Washington, March 1, '72.

D. T. WILLSON,
   D. FLEMING,
   CHAS. H. WILLSON,

*Executors of Thos. H. Willson, deceased.*

Witnesses to signature of D. T. Willson and D. Fleming:
  HIRAM WILLSON,
  SAML. M. McCARRELL.

Witnesses to signature of Chas. H. Willson:
  ROBT. F. BORCKMAN,
  L. D. WILLSON.